(12) United States Patent
Ando et al.

(10) Patent No.: US 10,753,771 B2
(45) Date of Patent: Aug. 25, 2020

(54) BRUSHLESS RESOLVER AND ROTATION-ANGLE DETECTION DEVICE

(71) Applicant: HONDA MOTOR CO., LTD., Tokyo (JP)

(72) Inventors: Tomoya Ando, Tokyo (JP); Kenichi Nakazato, Tokyo (JP); Manabu Yazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/762,875

(22) PCT Filed: Aug. 29, 2016

(86) PCT No.: PCT/JP2016/075178
§ 371 (c)(1),
(2) Date: Mar. 23, 2018

(87) PCT Pub. No.: WO2017/056817
PCT Pub. Date: Apr. 6, 2017

(65) Prior Publication Data
US 2018/0299298 A1 Oct. 18, 2018

(30) Foreign Application Priority Data
Sep. 30, 2015 (JP) .................. 2015-193155

(51) Int. Cl.
*G01D 5/20* (2006.01)
(52) U.S. Cl.
CPC .................. *G01D 5/2073* (2013.01)

(58) Field of Classification Search
CPC ........ G01D 5/2073; G01B 7/30; H02K 5/161; H02K 5/16
(Continued)

(56) References Cited

U.S. PATENT DOCUMENTS 5,705,872 A 1/1998 Loge
8,415,945 B2 4/2013 Fujita et al.
(Continued)

FOREIGN PATENT DOCUMENTS

CN 1825506 A 8/2006
CN 102044944 A 5/2011
(Continued)

OTHER PUBLICATIONS

Search Report issued in International Patent Application No. PCT/JP2016/075178, dated Nov. 29, 2016.
(Continued)

*Primary Examiner* — Melissa J Koval
*Assistant Examiner* — Trung Nguyen
(74) *Attorney, Agent, or Firm* — Greenblum & Bernstein, P.L.C.

(57) ABSTRACT

A brushless resolver includes a rotor having a one-phase excitation coil and a stator having two-phase detection coils. The rotor is mounted to a shaft of a motor to detect a rotation angle of the motor. An induction coil is located around the shaft. The induction coil is connected to the excitation coil. Electromotive force induced in the induction coil by a change of magnetic flux of the motor, which passes through the shaft, is used as an excitation signal supplied to the excitation coil.

4 Claims, 4 Drawing Sheets

(58) Field of Classification Search
USPC ...... 324/200, 207.17–207.25, 500, 545, 160, 324/177, 139, 143, 772, 86, 600, 631
See application file for complete search history.

(56) References Cited

U.S. PATENT DOCUMENTS

| | | | |
|---|---|---|---|
| 9,013,132 B2 | 4/2015 | Nakazato | |
| 9,500,500 B2 | 11/2016 | Ookawara et al. | |
| 9,857,203 B2 | 1/2018 | Nakazato et al. | |
| 2004/0144173 A1* | 7/2004 | Umeno | G01L 5/164 73/325 |
| 2005/0174106 A1 | 8/2005 | Inoue | |
| 2010/0321007 A1* | 12/2010 | Fukuda | G01D 5/2093 324/207.25 |
| 2012/0274185 A1 | 11/2012 | Kanemitsu et al. | |
| 2013/0193957 A1* | 8/2013 | Zhou | G01D 5/2046 324/207.16 |
| 2015/0162798 A1* | 6/2015 | Ozawa | H02K 5/1735 310/43 |
| 2015/0345997 A1 | 12/2015 | Yamamoto | |

FOREIGN PATENT DOCUMENTS

| | | |
|---|---|---|
| CN | 10253113 A | 11/2011 |
| CN | 202816634 U | 3/2013 |
| EP | 2562516 A1 | 2/2013 |
| JP | 2003-302255 A | 10/2003 |
| JP | 2004-132477 A | 4/2004 |
| JP | 2010-101633 A | 5/2010 |
| JP | 2012-019575 A | 1/2012 |
| JP | 2012-231648 A | 11/2012 |
| JP | 2013-113835 A | 6/2013 |

OTHER PUBLICATIONS

Search Report issued in European Patent Office (EPO) family member Patent Appl. No. 16850993.3, dated Sep. 17, 2018.
Office Action issued in China family member Patent Appl. No. 201680053512.1, dated Sep. 26, 2019, along with an English translation thereof.
Office Action issued in Chinese Counterpart Patent Appl. No. 201680053512.0, dated Jul. 1, 2020, along with an English translation thereof.

* cited by examiner

BRUSHLESS RESOLVER AND ROTATION-ANGLE DETECTION DEVICE

TECHNICAL FIELD

The present invention relates to a brushless resolver that detects the rotation angle of a motor, and to a rotation-angle detection device that uses this brushless resolver.

BACKGROUND ART

FIG. 1 shows a configuration disclosed in Patent Literature 1 as an example of a conventional brushless resolver. This brushless resolver includes a ring-shaped resolver 13 disposed in a cylindrical case 12 that covers a rotation-center shaft 11, a ring-shaped rotation transformer 20 disposed side by side with the resolver 13, and lead wires 27 electrically connected to the resolver 13 and to the rotation transformer 20.

The resolver 13 is composed of a resolver rotor 14 that is rotatable around the shaft 11 and a resolver stator 17 fixed to the cylindrical case 12. The resolver rotor 14 is configured by winding resolver-rotor windings 16 around resolver-rotor iron cores 15. The resolver stator 17 is configured by winding resolver-stator windings 19 around resolver-stator iron cores 18.

When the resolver 13 is a one-phase excitation and two-phase output resolver, the resolver-rotor windings 16 are made of one-phase distributed windings, and the resolver-stator windings 19 are made of two-phase distributed windings (sin windings and cos windings) separated from each other by an electrical angle of 90 degrees. In the resolver 13 having such a configuration, when the resolver rotor 14 is excited by an excitation signal sent from the rotation transformer 20, two signals corresponding to the rotation angle are generated on the resolver stator 17 side, and the rotation angle can be calculated from the two signals.

The rotation transformer 20 is composed of a rotor transformer 21 that is rotatable around the shaft 11 and a stator transformer 24 fixed to the cylindrical case 12. The rotor transformer 21 is composed of a ring-shaped rotor-transformer iron core 22 and a rotor-transformer winding 23 of a multiwinding magnet wire wound in the circumferential direction of the rotor-transformer iron core 22. The stator transformer 24 is composed of a ring-shaped stator-transformer iron core 25 and stator-transformer windings 26, the stator-transformer windings 26 being multiwinding magnet wires wound around bobbins disposed in the stator-transformer iron core 25 and wound in a bobbin's circumferential direction.

When the rotation transformer 20 is configured in this manner, an excitation signal electrically sent via a lead wire 27 to the stator transformer 24 is transferred to the rotor transformer 21 side in a noncontact manner as a voltage signal corresponding to the winding ratio between the stator-transformer windings 26 and the rotor-transformer windings 23. Then, this excitation signal is electrically sent to the resolver-rotor windings 16 of the resolver rotor 14 connected to the rotor transformer 21, thereby allowing the rotation position to be detected by the resolver 13.

PRIOR ART LITERATURE

Patent Literature

Patent Literature 1: Japanese Patent Application Laid Open No. 2010-101633

SUMMARY OF THE INVENTION

Problems to be Solved by the Invention

As described above, a conventional brushless resolver uses a rotation transformer to supply an excitation signal to the resolver-rotor windings, which increases the number of components used and also the total component cost and the number of assembly steps.

An object of the present invention is to provide a brushless resolver in which a rotation transformer is made unnecessary, so that the total component cost and the number of assembly steps are reduced to reduce the cost of the brushless resolver, compared with the conventional brushless resolvers. In addition, another object of the present invention is to provide a rotation-angle detection device that uses this brushless resolver.

Means to Solve the Problems

According to a first aspect of the present invention, a brushless resolver includes a rotor having a one-phase excitation coil and a stator having two-phase detection coils. The rotor is mounted to a shaft of a motor to detect a rotation angle of the motor. An induction coil is located around the shaft and is connected to the excitation coil. Electromotive force induced in the induction coil by a change of magnetic flux of the motor, the magnetic flux passing through the shaft, is used as an excitation signal supplied to the excitation coil.

According to a second aspect of the present invention, a rotation-angle detection device includes the above-described brushless resolver; an excitation-signal-component extraction circuit that extracts an excitation signal component from output signals of the two-phase detection coils and outputs the excitation signal component as a detection signal; an angle calculation circuit that synchronously detects the output signals of the two-phase detection coils with the detection signal to perform an angle calculation; and an angle hold circuit to which a rotation angle and an angular velocity of the rotor calculated by the angle calculation circuit are input. The angle hold circuit outputs the input rotation angle when the input angular velocity is not zero and outputs the immediately-before-input rotation angle when the input angular velocity is zero.

Effects of the Invention

According to the present invention, the rotation transformer conventionally required to supply an excitation signal to the excitation coil provided for the rotor is made unnecessary, so that the total component cost and the number of assembly steps are reduced to reduce the cost of the brushless resolver.

The excitation circuit conventionally required to generate an excitation signal is also made unnecessary, so that the cost of the brushless resolver is further reduced.

DETAILED DESCRIPTION OF THE EMBODIMENTS

Embodiments of the present invention will be described below.

Figure 2:
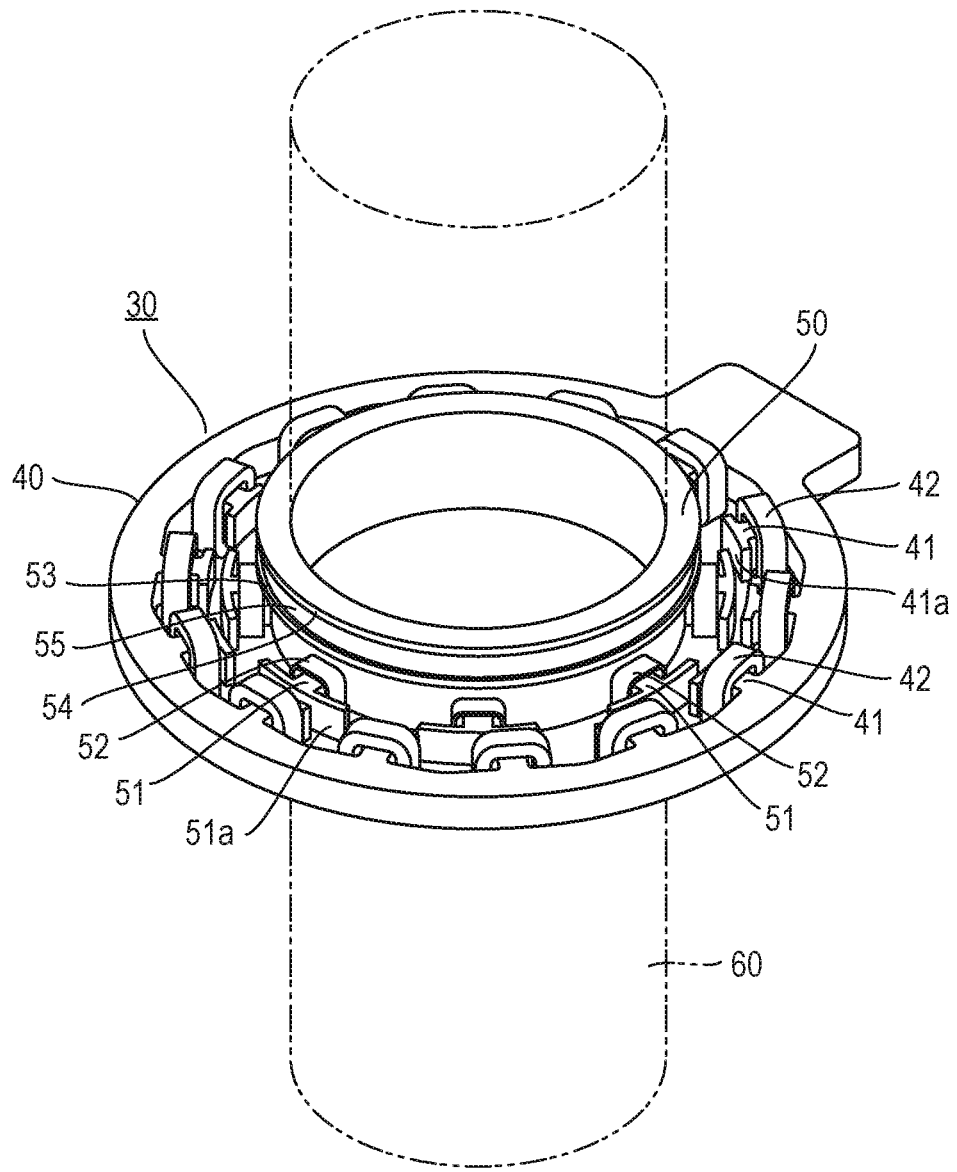
FIG. 2 is a perspective view of a brushless resolver according to an embodiment of the present invention.
Figure 3:
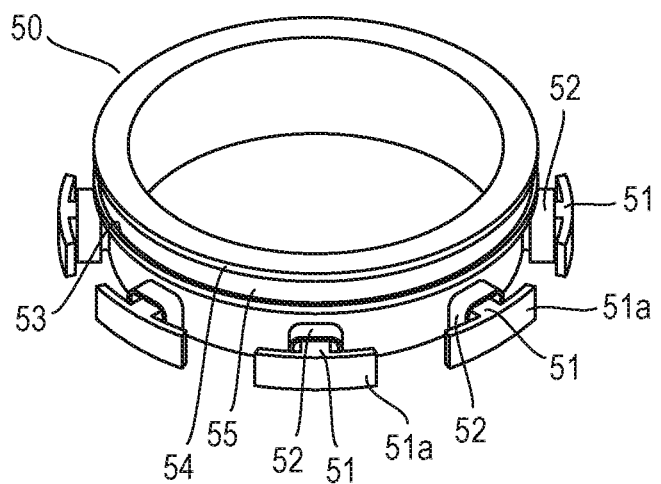
FIG. 3 is a perspective view of a rotor shown in FIG. 2.
Figure 4:
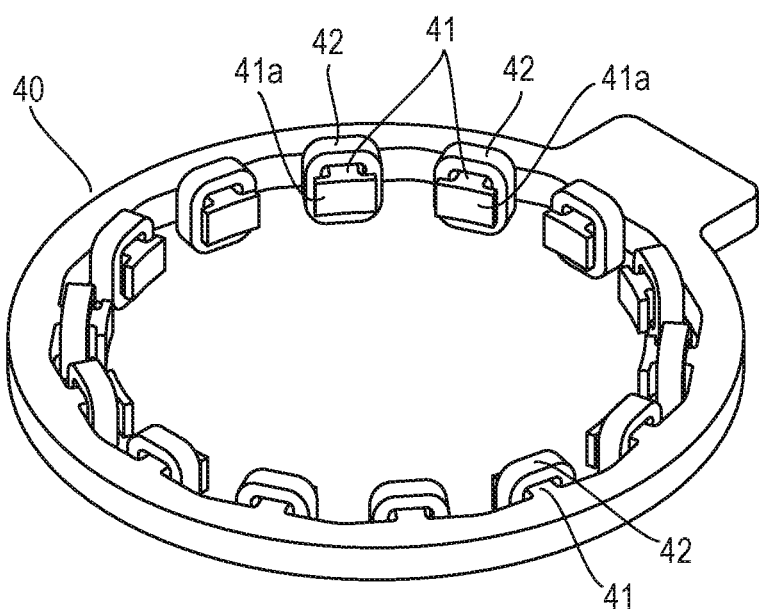
FIG. 4 is a perspective view of a stator shown in FIG. 2.

FIG. 2 shows a one-phase excitation and two-phase output brushless resolver 30 according to an embodiment of the present invention. The brushless resolver 30 includes a ring-shaped stator 40 and a rotor 50 positioned in the internal space inside the stator 40. FIG. 3 and FIG. 4 show the rotor 50 and the stator 40 separately. 60 in FIG. 2 shows a shaft of a motor to which the rotor 50 is to be mounted.

The rotor 50 has a cylindrical shape and has teeth 51 which are formed in a protruding manner, disposed on one side, in the center-axis direction, of the outer circumferential surface of the rotor 50 and arranged at equal angular intervals in the circumferential direction of the rotor 50. The number of teeth 51 is set to eight in this embodiment. Each of one-phase excitation coils 52, which has a predetermined number of windings and a predetermined winding direction, is wound around a corresponding one of the teeth 51. A detailed illustration is omitted, but the excitation coils 52 are connected in series.

In this embodiment, a ring-shaped depressed part 53 is formed on the other side, in the center-axis direction, of the outer circumferential surface of the rotor 50. The other side of the rotor 50 serves as a winding frame 54. An induction coil 55 is wound around the winding frame 54. A detailed illustration is omitted, but the induction coil 55 is connected to the excitation coils 52 in series.

Teeth 41 are formed in a protruding manner, disposed on the inner circumferential surface of the ring-shaped stator 40 and arranged at equal angular intervals in the circumferential direction of the stator 40. The number of teeth 41 is set to 14 in this embodiment. A detailed illustration is omitted, but two detection coils (COS coils and SIN coils) 42 are wound around the teeth 41. Each of the COS coils, which has a predetermined number of windings and a predetermined winding direction, is wound around a corresponding one of the teeth 41. Each of the SIN coils, which has a predetermined number of windings and a predetermined winding direction, is also wound around a corresponding one of the teeth 41. The COS coils are connected in series, and the SIN coils are also connected in series.

When the rotor 50 is mounted around the shaft 60 of the motor, as shown in FIG. 2, the stator 40 is disposed in a fixed manner around the rotor 50 to constitute the brushless resolver 30. The diameter (outer diameter of the rotor) of a virtual cylindrical surface formed of the protrusion end surfaces 51a of the teeth 51 of the rotor 50 is smaller, by a predetermined length, than the diameter (inner diameter of the stator) of a virtual cylindrical surface formed of the protrusion end surfaces 41a of the teeth 41 of the stator 50. Therefore, the rotor 50 is rotatable in the internal space inside the stator 40.

Figure 1:
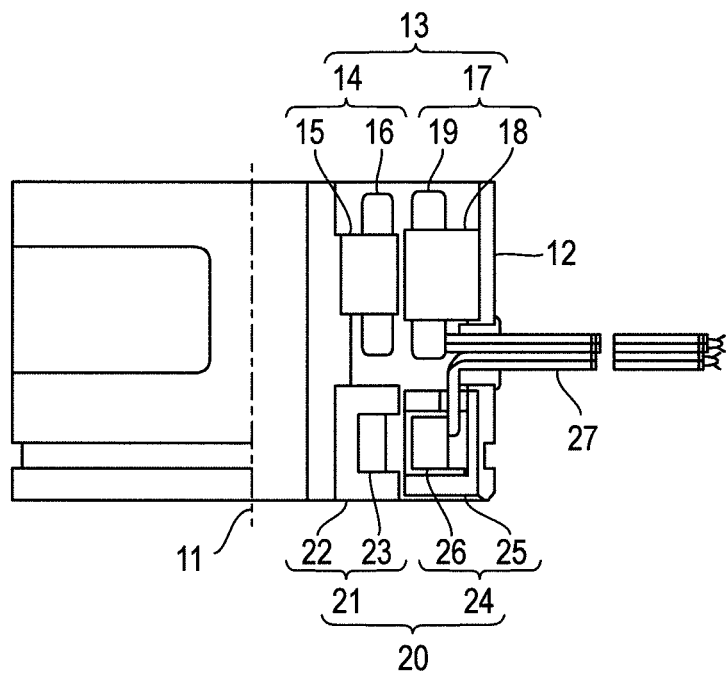
FIG. 1 is a half sectional view of an example of a conventional brushless resolver.

The brushless resolver 30 having the above-described structure is different from the conventional brushless resolver shown in FIG. 1 in that the brushless resolver 30 does not have a rotation transformer used to send an excitation signal to the excitation coils 52 wound on the rotor 50 but has the induction coil 55 wound around the winding frame 54 formed on the rotor 50 as a single unit. The induction coil 55 is wound around the winding frame 54 of the rotor 50, which means that the induction coil 55 is located away from and around the shaft 60 of the motor in a state where the induction coil 55 coils in the circumferential direction of the shaft 60. Therefore, electromotive force (induced electromotive force) is induced in the induction coil 55 by a change of magnetic flux of the motor which passes through the shaft 60. In this embodiment, the electromotive force induced in the induction coil 55 is used as an excitation signal supplied to the excitation coils 52.

Consequently, in this embodiment, a rotation transformer, which is formed of many components and used to send an excitation signal to the excitation coils 52, is unnecessary, allowing the total component cost and the number of assembly steps to be reduced in response to unnecessity of the rotation transformer. In addition, since the electromotive force induced in the induction coil 55 is used as an excitation signal, an excitation circuit for generating an excitation signal, which was conventionally required, can be made unnecessary.

The winding frame 54 around which the induction coil 55 is wound is formed on the rotor 50 as a single unit in the above-described embodiment. The winding frame 54 may be formed separately from the rotor 50.

The electromotive force induced in the induction coil 55 by a change of magnetic flux of the motor, that is, an excitation signal in the above-described brushless resolver 30, can be expressed as follows:

$$V_E = \varphi \cdot 2\pi f \cdot K \cdot \cos(2\pi f t),$$

where $\varphi$ indicates the magnetic flux, f indicates the number of rotations, and K indicates the constant determined by the number of windings of the induction coil and the cross-sectional area of the shaft.

The magnetic flux of the motor which passes through the shaft 60 is, for example, a leakage flux of the motor. Therefore, a leakage flux of the motor can be used to generate an excitation signal. The magnetic flux of the motor is not limited to this. For example, one idea would be to intentionally generate a magnetic flux from the motor just for generating an excitation signal.

The configuration of a rotation-angle detection device made by using the above-described brushless resolver 30 will be described below by referring to FIG. 5.

Figure 5:
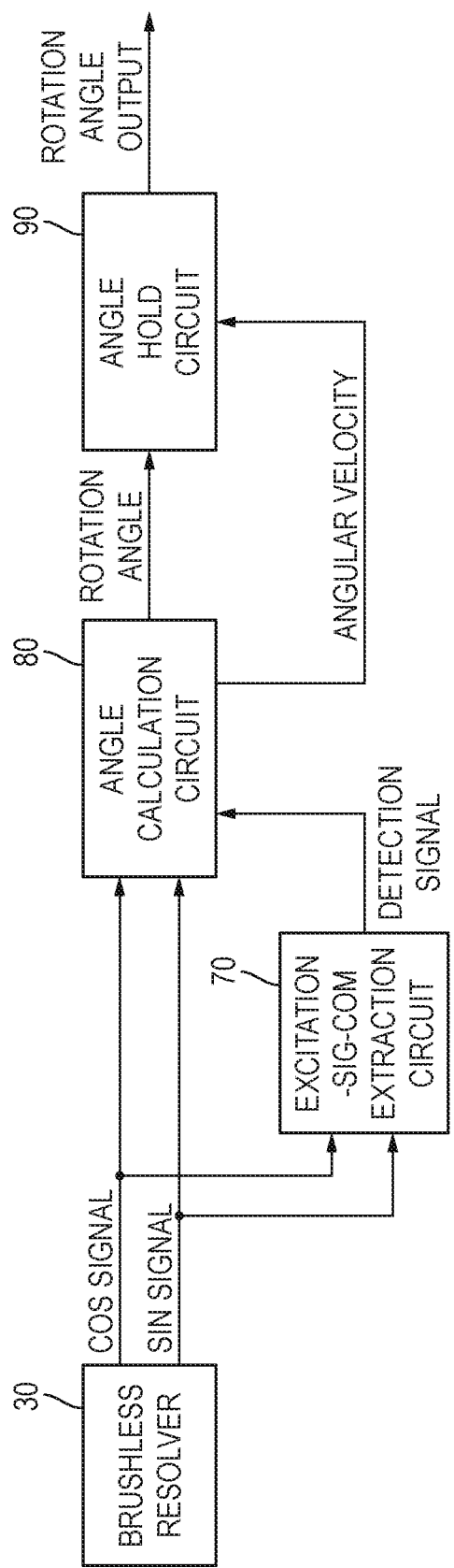
FIG. 5 is a block diagram showing an exemplary functional configuration of a rotation-angle detection device according to the present invention.

As shown in FIG. 5, the rotation-angle detection device in this embodiment includes the brushless resolver 30, an excitation-signal-component extraction circuit 70, an angle calculation circuit 80, and an angle hold circuit 90. The two-phase output signals (COS signal and SIN signal) output from the two-phase detection coils (COS coils and SIN coils) 42 of the brushless resolver 30 are both input to the excitation-signal-component extraction circuit 70 and to the angle calculation circuit 80. These COS signal and the SIN signal can be expressed by the following expressions.

$$\text{COS signal: } V_C = A \cdot \cos \omega t \cdot \cos N\theta,$$

$$\text{SIN signal: } V_S = A \cdot \cos \omega t \cdot \sin N\theta,$$

where $A = \varphi \cdot 2\pi f \cdot K \cdot T$, $\omega = 2\pi f$, T indicates the voltage transformation ratio, N indicates the drive number, and $\theta$ indicates the rotation angle.

The excitation-signal-component extraction circuit 70 extracts an excitation signal component from the input COS signal and SIN signal. The excitation signal component is extracted by the following operation.

$$\sqrt{(V_C^2 + V_S^2)} = \sqrt{\{(A \cdot \cos\omega t \cdot \cos N\theta)^2 + (A \cdot \cos\omega t \cdot \sin N\theta)^2\}}$$
$$= \sqrt{\{A^2 \cdot \cos^2\omega t(\cos^2 N\theta + \sin^2 N\theta)\}}$$
$$= A \cdot \cos\omega t$$

The excitation-signal-component extraction circuit 70 outputs the extracted excitation signal component to the angle calculation circuit 80 as a detection signal.

The angle calculation circuit 80 is designed to execute, for example, an angle calculation of a conventionally known tracking loop type. The angle calculation circuit 80 synchronously detects the input COS signal and SIN signal by using the input detection signal to perform the angle calculation.

When the motor is stopped, a change of magnetic flux does not occur, making the output signals (COS signal and SIN signal) of the brushless resolver 30 zero. Therefore, the angle calculation cannot be performed. In this embodiment, an angle hold circuit 90 is provided in order to compensate an output when the motor is stopped.

The rotation angle and the angular velocity of the rotor 50 calculated by the angle calculation circuit 80 are input to the angle hold circuit 90. The angle hold circuit 90 outputs the input rotation angle when the input angular velocity is not zero. When the input angular velocity is zero, the angle hold circuit 90 outputs the rotation angle input immediately before.

Since the above configuration is employed, even when the motor is stopped, the rotation angle of the rotor 50, that is, the rotation angle of the motor, can be detected.

INDUSTRIAL APPLICABILITY

A brushless resolver and a rotation-angle detection device according to the present invention can be used to detect the rotation position of a rotor of a motor used in a hybrid vehicle or an electric vehicle and also to detect the rotation position of various units, such as a machine tool driven by a motor.

What is claimed is:

1. A rotation-angle detection device comprising:
    a brushless resolver that includes: a stator having two-phase detection coils; a rotor having a one-phase excitation coil, the rotor being to be mounted to a shaft of the motor; and an induction coil connected to the excitation coil and to be located around the shaft, the induction coil inducing electromotive force in response to a change of magnetic flux of the motor, the magnetic flux passing through the shaft, and the electromotive force being supplied to the excitation coil as an excitation signal;
    an excitation-signal-component extraction circuit that extracts an excitation signal component from output signals of the two-phase detection coils and outputs the excitation signal component as a detection signal;
    an angle calculation circuit that synchronously detects the output signals of the two-phase detection coils with the detection signal to perform an angle calculation; and
    an angle hold circuit to which a rotation angle and an angular velocity of the rotor calculated by the angle calculation circuit are input, the angle hold circuit outputting the input rotation angle when the input angular velocity is not zero and outputting the immediately-before-input rotation angle when the input angular velocity is zero.

2. The rotation-angle detection device according to claim 1, wherein the magnetic flux of the motor is a leakage flux of the motor.

3. The rotation-angle detection device according to claim 1, wherein the induction coil is wound around a winding frame formed on the rotor as a single unit.

4. The rotation-angle detection device according to claim 2, wherein the induction coil is wound around a winding frame formed on the rotor as a single unit.

* * * * *